US 11,072,037 B2

(12) United States Patent
Walpole et al.

(10) Patent No.: US 11,072,037 B2
(45) Date of Patent: Jul. 27, 2021

(54) METHOD OF FRICTION WELDING WORKPIECES BY ADJUSTING A SWEEP LENGTH

(71) Applicant: ROLLS-ROYCE plc, London (GB)

(72) Inventors: Andrew R Walpole, Derby (GB);
Simon E Bray, Derby (GB); Robin Wilson, Derby (GB)

(73) Assignee: ROLLS-ROYCE plc, London (GB)

( * ) Notice: Subject to any disclaimer, the term of this patent is extended or adjusted under 35 U.S.C. 154(b) by 231 days.

(21) Appl. No.: 16/431,266

(22) Filed: Jun. 4, 2019

(65) Prior Publication Data

US 2019/0375044 A1    Dec. 12, 2019

(30) Foreign Application Priority Data

Jun. 11, 2018 (GB) .................................... 1809530

(51) Int. Cl.
  *B23K 20/00* (2006.01)
  *B23K 20/12* (2006.01)
  *B23K 101/00* (2006.01)
(52) U.S. Cl.
  CPC .... *B23K 20/1205* (2013.01); *B23K 2101/001* (2018.08)
(58) Field of Classification Search
  CPC .... B23K 20/10; B23K 11/0026; B23K 11/008
  See application file for complete search history.

(56) References Cited

U.S. PATENT DOCUMENTS

| 6,160,237 A | 12/2000 | Schneefeld et al. |
| 7,624,907 B2 * | 12/2009 | Alessi ................ B23K 20/1205 |
| | | 156/73.5 |

(Continued)

FOREIGN PATENT DOCUMENTS

| EP | 1555081 A1 | 7/2005 |
| EP | 2243587 A1 | 10/2010 |

(Continued)

OTHER PUBLICATIONS

Jul. 31, 2019 Search Report Issued in European Patent Application No. EP19177644.

(Continued)

*Primary Examiner* — Erin B Saad
(74) *Attorney, Agent, or Firm* — Oliff PLC (57) ABSTRACT

A method of friction welding a first workpiece to a second workpiece, includes the first workpiece with a first faying surface having a first faying length, the second workpiece with a second faying surface having a second faying length, the second faying length greater than the first faying length; positioning the first workpiece adjacent the second workpiece; reciprocating the first workpiece and the second workpiece against one another, the first faying moves relative to the second faying by a sweep length, a temperature at the first and second faying surfaces increases to create a weld interface; each of the first and second workpieces are consumed into the weld interface, adjusting the sweep length the sweep length remains equal to a difference between the second and the first faying lengths; and stopping the reciprocating and allowing the first and second workpieces to cool to weld the first and second workpieces together.

10 Claims, 4 Drawing Sheets

(56) References Cited

U.S. PATENT DOCUMENTS

2007/0152022 A1* 7/2007 Strahm .............. B23K 20/1205
228/114
2011/0129347 A1 6/2011 Schneefeld et al.
2019/0022789 A1* 1/2019 Mast ................. B23K 20/1205

FOREIGN PATENT DOCUMENTS

| EP | 3117946 A1 | 1/2017 |
| EP | 3287226 A2 | 2/2018 |
| GB | 2553146 A | 2/2018 |

OTHER PUBLICATIONS

Jul. 25, 2018 Search Report issued in British Patent Application No. 1809530.7.

* cited by examiner

METHOD OF FRICTION WELDING WORKPIECES BY ADJUSTING A SWEEP LENGTH

This disclosure claims the benefit of UK Patent Application No. GB 1809530.7, filed on 11 Jun. 2018, which is hereby incorporated herein in its entirety.

FIELD OF THE DISCLOSURE

The present disclosure relates to a method of linear friction welding and particularly, but not exclusively, to a method of linear friction welding for use with pyramidal stub workpieces.

BACKGROUND TO THE DISCLOSURE

Linear friction welding (LFW) is a solid state welding process for joining regular and irregular sections of metallic or non-metallic materials either welded to one another.

Welds are produced by linear oscillation, at a given frequency, of one part against the other while the parts are pressed together by a forge force applied to the interface.

During the LFW process, the components are locally heated at the contact zone by the friction force resulting from the combination of relative oscillatory motion and the forge force. As the temperature at the contact zone increases, the material becomes highly plastic, and flash is extruded from the weld zone under the action of the oscillatory motion and the forge force.

The continued application of the forge force during the LFW process causes the components to become closer together in a direction normal to that of the oscillatory motion. This length reduction occurs as long as the component material behaves in a plastic manner.

When the components have reached the desired length reduction (known as the burn-off distance) the oscillation amplitude is ramped-down to zero, and the parts are hot-forged together by the forge force for a predetermined time whilst the weld cools.

Conventionally, the heat generated during the oscillation portion of the LFW process is localized to the central region of the weld interface (or contact zone). This local concentration of heat energy can result in weld defects such as one workpiece 'digging into' the other workpiece, or edge detachment of one or other of the workpieces. Such problems can cause a defective weld.

STATEMENT OF DISCLOSURE

According to a first aspect of the present disclosure there is provided a method of friction welding a first workpiece to a second workpiece, the method comprising the steps of:
  (a) providing the first workpiece with a first faying surface, and the second workpiece with a second faying surface, the first faying surface having a first faying length, and the second faying surface having a second faying length, the second faying length being greater than the first faying length;
  (b) positioning the first workpiece adjacent the second workpiece with the first faying surface being in engagement with the second faying surface;
  (c) reciprocating the first workpiece and the second workpiece against one another such that the first faying surface moves relative to the second faying surface by a sweep length, such that a temperature at the first and second faying surfaces increases to create a weld interface;
  (d) as the weld process progresses and each of the first workpiece and second workpiece are consumed into the weld interface, adjusting the sweep length such that the sweep length remains equal to a difference between the second faying length and the first faying length; and
  (e) stopping the reciprocating and allowing the first workpiece and the second workpiece to cool to weld the first workpiece and the second workpiece together.

The selection of the sweep length (or oscillation amplitude) as being equal to, or greater than, the difference between the lengths of the faying surfaces of the contacting workpieces ensures that the reciprocation process sweeps the entirety of each faying surface.

By sweeping across the whole of each faying surface, the heat energy generated by the frictional forces between the two workpieces is distributed across the full contacting length between the workpieces. This in turn ensures that heat energy is distributed more evenly across the weld interface and, in particular, prevents 'cold corners' forming at the edges of the workpieces.

'Cold corners' can lead to deformation of the edge of the LFW stub, which may compromise optimum conditions for the extrusion and ejection of contamination from the weld. In extreme circumstances, the deformed stub corners may detach, further compromising optimum material flow conditions. This deformation and detachment of the stub corners may occur symmetrically or asymmetrically.

A more even distribution of heat energy across the weld interface will result in a more uniform and stronger weld joint having significantly fewer defects. This makes the method of the disclosure more efficient than prior art methods at producing high quality LFW joints.

Optionally, step (a) comprises the additional subsequent step of:
  (a)' providing at least one of the first faying surface and the second faying surface, with an inclined flank surface along at least one of the two opposing lateral edges to the respective one of the first faying surface and the second faying surface.

As the weld process progresses, material from the first and second workpieces will be consumed into the weld interface. The rate of consumption of the workpieces into the weld interface will be dependent upon, for example, the hardness of the material forming the workpiece. For an arrangement in which one workpiece has a higher hardness value than the other workpiece, the softer workpiece (i.e. material with a lower hardness) would be consumed at a higher rate than the harder workpiece (i.e. material with a higher hardness).

As the first and second workpieces are consumed into the weld interface, the lengths of each of the faying surfaces will change due to the presence of the inclined flank surfaces at the lateral edges of the faying surfaces. For example, the length of each faying surface on each workpiece having inclined flank surfaces will increase during the weld process. As the lengths of the faying surfaces change during the weld process it will be necessary to adjust the sweep length in order to ensure that the first faying surface sweeps across the entirety of the second faying surface.

Optionally, step (a) comprises the step of:
  (a)" providing the first workpiece with a first faying surface, and the second workpiece with a second faying surface, the first faying surface having a first faying length, and the second faying surface having a second faying length, the second faying length being between three and eight times the first faying length.

In one arrangement of the disclosure, the second faying length is approximately four times the first faying length. This arrangement provides a balance between ensuring that there is sufficient heat energy input to maintain the LFW process while at the same time allowing the sweep length to ensure that the heat energy is uniformly distributed across the faying surfaces and, in particular, to the ends of the faying lengths.

Optionally, the first workpiece is formed from a first material, and the second workpiece is formed from a second material, the first material having a first strength parameter, and the second material having a second strength parameter, the first strength parameter being greater than the second strength parameter.

In one arrangement of the disclosure, the first and second workpieces are formed from dissimilar materials, with the first workpiece being formed from a harder material than the second workpiece. In this arrangement, as the weld process progresses, the softer second workpiece would be consumed into the weld zone at a higher rate than the first workpiece. As a consequence, the sweep length would have to increase through the weld process.

Optionally, the strength parameter is selected from the group consisting of hardness, flow stress, yield stress and ultimate tensile stress.

Optionally, the first workpiece is a blade of a bladed disk, and the second workpiece is a hub of the bladed disk.

In one arrangement of the disclosure, the blades for a bladed disk may be formed from a high performance alloy material having, for example, a high hardness, while the hub of the bladed disk is formed from a softer lower performance alloy material. This situation is not uncommon in that it allows the high performance, and consequently high cost, material to be used for the blades, while a lower cost, and lower performance, material is used for the hub.

Optionally, the first workpiece is a vane of a gas turbine engine, or a propeller, and the second workpiece is a hub of the gas turbine engine, or the propeller.

According to a second aspect of the present disclosure there is provided a computer program that, when read by a computer, causes performance of the method according to the first aspect.

According to a third aspect of the present disclosure there is provided a non-transitory computer readable storage medium comprising computer readable instructions that, when read by a computer, causes performance of the method according to the first aspect.

According to a fourth aspect of the present disclosure there is provided a signal comprising computer readable instructions that, when read by a computer, causes performance of the method according to the first aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear.

The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centerline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fiber. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fiber or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
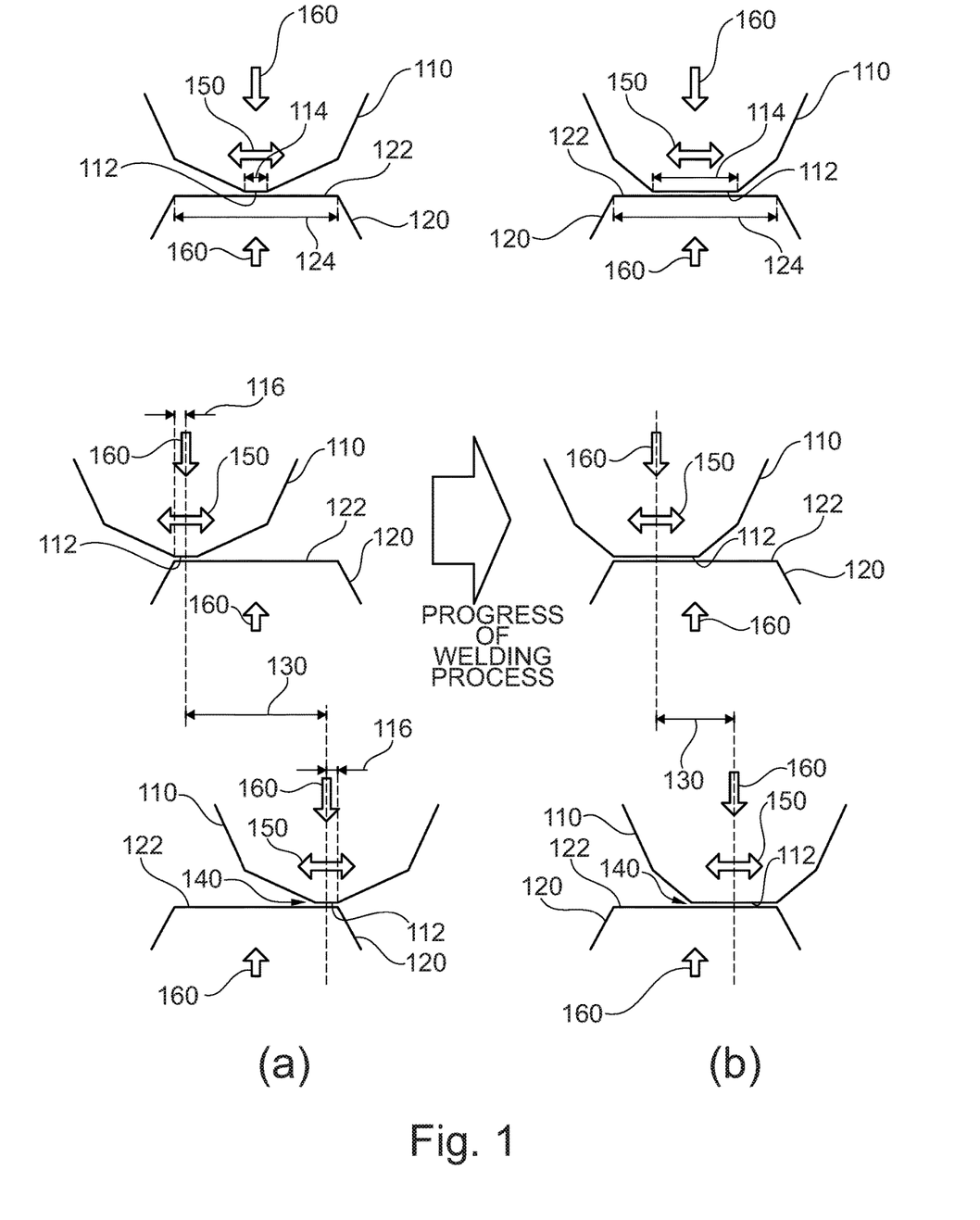
FIG. 1(a) is a schematic sectional side view through a first and second workpiece according an embodiment of the disclosure, illustrating the sweep length at the start of the weld process.
FIG. 1(b) is a schematic sectional side view through the first and second workpiece of the arrangement of FIG. 1(a) at a later stage of the weld process.

FIGS. 1(a) and 1(b) illustrate schematically a linear friction welding (LFW) method according to an embodiment of the disclosure. In the arrangement of FIGS. 1(a) and 1(b) the first workpiece and the second workpiece are formed from similar materials.

A first workpiece 110 has a first faying surface 112. The first faying surface 112 has a first faying length 114. A second workpiece 120 has a second faying surface 122. The second faying surface 112 has a second faying length 124. The second faying length 124 is greater than the first faying length 114.

The first workpiece 110 and the second workpiece 120 are positioned such that the first faying surface 112 is in engagement with the second faying surface 122. This arrangement is typical of any linear friction welding process.

The first workpiece 110 and the second workpiece 120 are reciprocated 150 against one another while the first and second workpieces 110,120 are being urged towards one another by a forge force 160.

The reciprocating motion 150 between the first workpiece 110 and the second workpiece 120 is arranged such that the entire first faying surface 112 sweeps across the entire second faying surface 122. This relative movement between the first workpiece 110 and the second workpiece 120 is defined as a sweep length 130.

The sweep length 130 defines the relative movement between the first faying surface 112 and the second faying surface 122. As illustrated in FIG. 1(a) the sweep length 130 is equal to the difference between the second faying length 124 and the first faying length 114.

As the weld process progresses, FIG. 1(b) illustrates the arrangement of first workpiece 110 and second workpiece 120 at a time later in the progress of the weld process.

As FIG. 1(b) shows, as the weld process progresses each of the first workpiece 110 and second workpiece 120 at their respective first and second faying surfaces 112,122 are consumed into the weld interface 140. This results in each of the first faying length 114 and the second faying length 124 increasing in magnitude. This in turn results in a change to the sweep length 130.

In the example illustrated in FIGS. 1(a) and 1(b), the sweep length 130 decreases in magnitude during the progress of the weld process. In other words, the first workpiece 110 has to move less far in order to completely sweep across the second workpiece 120.

Figure 2:
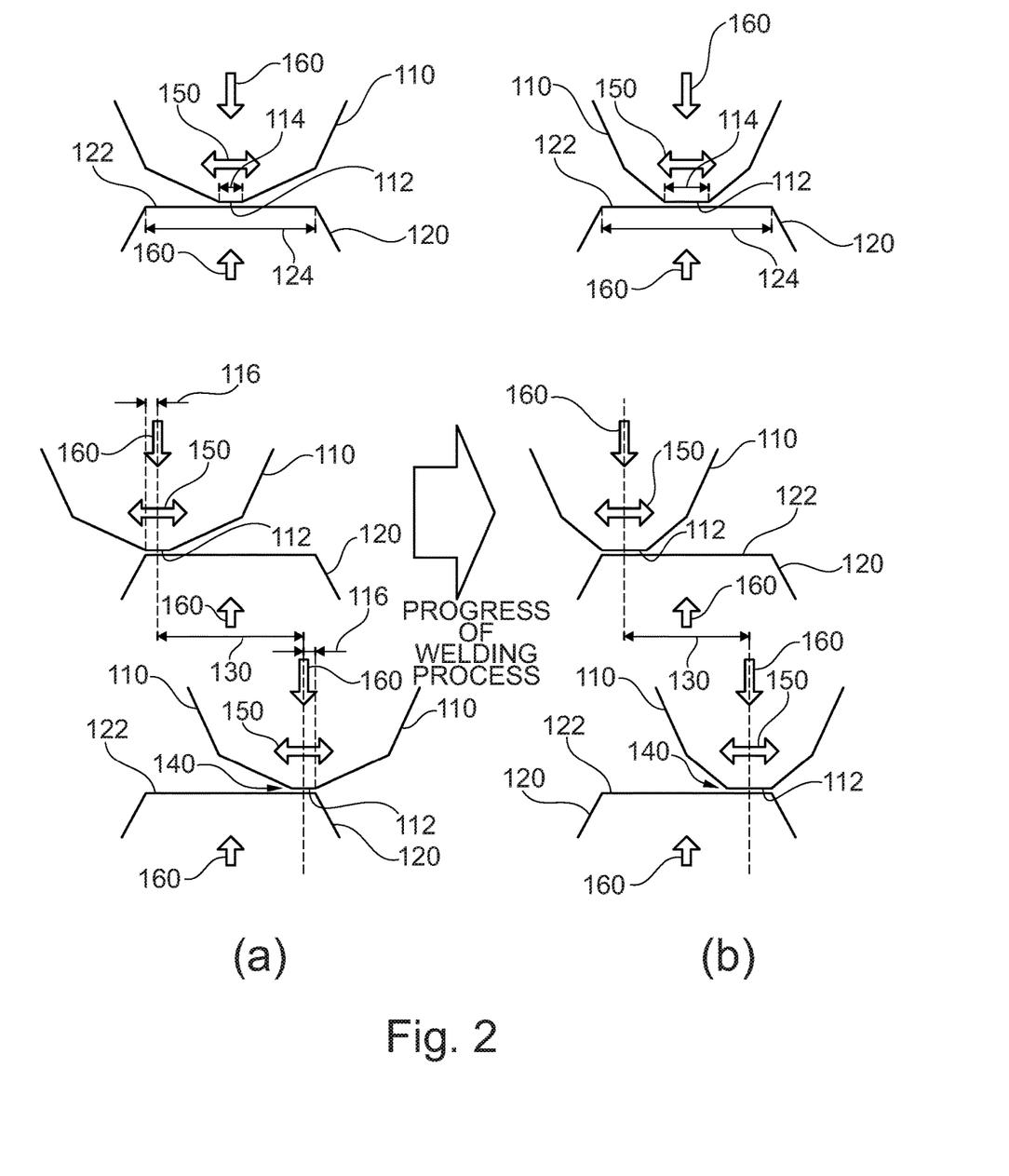
FIG. 2(a) is a schematic sectional side view corresponding to FIG. 1(a) with the first workpiece being harder than the second workpiece.
FIG. 2(b) is a schematic sectional side view corresponding to FIG. 1(b) with the first workpiece being harder than the second workpiece.

FIGS. 2(a) and 2(b) illustrate schematically the linear friction welding (LFW) method shown in FIGS. 1(a) and 1(b) for a situation where the first workpiece and the second workpiece are formed from dissimilar materials. In the example illustrated in FIGS. 2(a) and 2(b), the first workpiece 110 is formed from a harder material than the second workpiece 120.

As shown in the changes between FIGS. 2(a) and 2(b), the harder nature of the first workpiece 110 results in the second workpiece 120 being consumed preferentially into the weld interface 140 during the course of the weld process.

This preferential consumption of the second workpiece 120 over the first workpiece 110 means that the second faying length 124 of the second faying surface 122 increases at a faster rate than does the first faying length 114 of the first faying surface 112. As a consequence, in the arrangement of FIGS. 2(a) and 2(b), the sweep length 130 increases during the course of the weld process.

Figure 3:
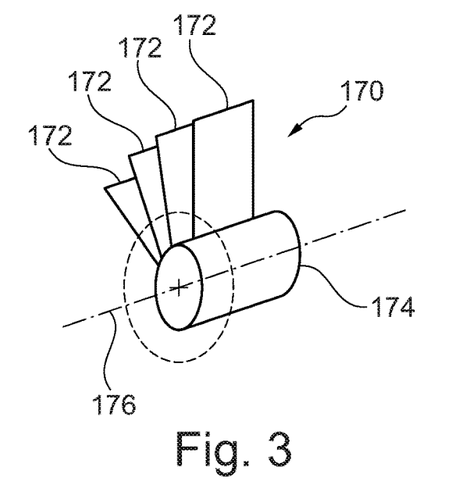
FIG. 3 is a schematic perspective view of a bladed disk formed by the method of the present disclosure.

A typical application of the method of the present disclosure is the fabrication of a bladed disk 170 as illustrated in FIG. 3. The bladed disk comprises a hub 174 and a plurality of blades 172 arranged as a circumferential array. Each of the plurality of blades 172 is attached to the hub 174 by a linear friction welding method such as, for example, the method of the present disclosure.

Figure 4:
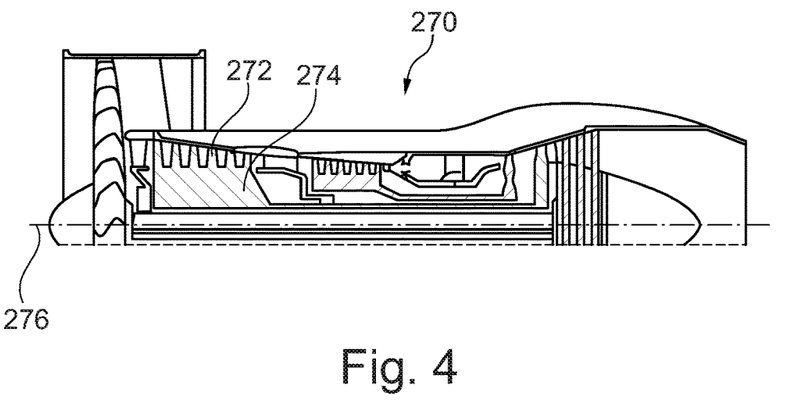
FIG. 4 is a schematic sectional partial side view of a gas turbine engine comprising a vane and hub joined by the method of the present disclosure.

In a further example, illustrated in FIG. 4, the method of the present disclosure may be applied to the stages of the intermediate compressor of a turbofan gas turbine engine 270. The intermediate compressor comprises several stages, with each stage comprising a hub 274 to which are attached a plurality of vanes 272 in a circumferential array. Each of the vanes 272 is attached to the hub 274 by a linear friction welding method such as, for example, the method of the present disclosure.

Figure 5:
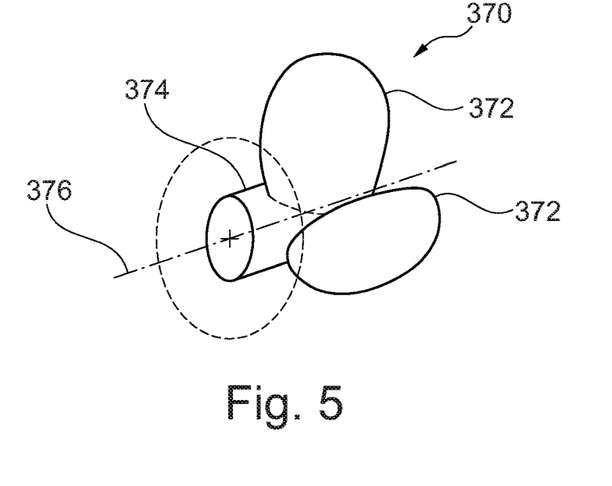
FIG. 5 is a schematic perspective view of a propeller formed by the method of the present disclosure.

A still further example of the application of the method of the present disclosure is shown in FIG. 5 as a marine propeller 370. The propeller 370 comprises a hub 374 to which is attached a plurality of vanes 374 in a circumferential array. Each of the vanes 372 is attached to the hub 374 by a linear friction welding method such as, for example, the method of the present disclosure.

Figure 6:
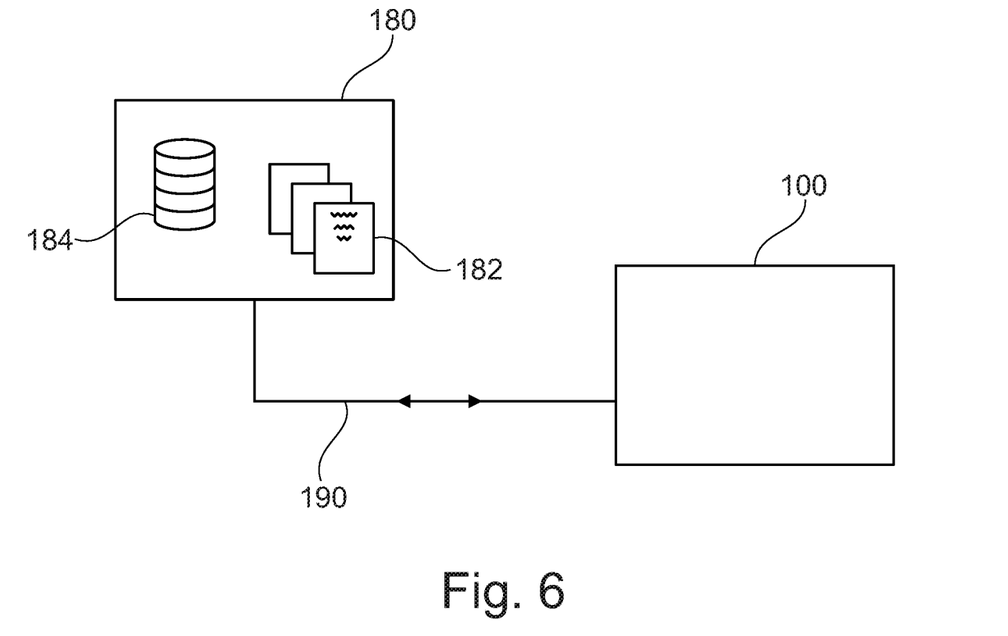
FIG. 6 is a close up schematic view of the computer control arrangement for the method of the present disclosure.

In another arrangement of the disclosure, the method of the resent disclosure may be controlled by a computer 180, as illustrated in FIG. 6. The computer 180 may comprise a computer program 182 that is stored in a computer readable storage medium 184. The computer sends and receives signals from the linear friction welding process 100 via a signal connection 190.

In one or more examples, the operations described may be implemented in hardware, software, firmware, or any combination thereof. If implemented in software, the operations may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a processor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Moreover, in determining extent of protection, due account shall be taken of any element which is equivalent to an element specified in the claims. Various changes to the described embodiments may be made without departing from the spirit and scope of the invention.

What is claimed is:

1. A method of friction welding a first workpiece to a second workpiece, the method comprising the steps of:
   (a) providing the first workpiece with a first faying surface, and the second workpiece with a second faying surface, the first faying surface having a first faying length, and the second faying surface having a second faying length, the second faying length being greater than the first faying length;
   (b) positioning the first workpiece adjacent the second workpiece with the first faying surface being in engagement with the second faying surface;
   (c) reciprocating the first workpiece and the second workpiece against one another such that the first faying surface moves relative to the second faying surface by a sweep length, and a temperature at the first and second faying surfaces increases to create a weld interface;
   (d) as the weld process progresses and each of the first workpiece and second workpiece are consumed into the weld interface, adjusting the sweep length such that the sweep length remains equal to a difference between the second faying length and the first faying length; and
   (e) stopping the reciprocating and allowing the first workpiece and the second workpiece to cool to weld the first workpiece and the second workpiece together,
   wherein at least one of the first faying length and the second faying length increases as the first workpiece and second workpiece are consumed into the weld interface.

2. The method of claim 1, wherein step (a) comprises the additional subsequent step of:
   (a)' providing at least one of the first faying surface and the second faying surface, with an inclined flank surface along at least one of the two opposing lateral edges to the respective one of the first faying surface and the second faying surface.

3. The method of claim 1, wherein step (a) comprises the step of:
   (a)" providing the first workpiece with a first faying surface, and the second workpiece with a second faying surface, the first faying surface having a first faying length, and the second faying surface having a second faying length, the second faying length being between three and eight times the first faying length.

4. The method of claim 1, wherein the first workpiece is formed from a first material, and the second workpiece is formed from a second material, the first material having a first strength parameter, and the second material having a second strength parameter, the first strength parameter being greater than the second strength parameter.

5. The method of claim 4, wherein the strength parameter is selected from the group consisting of hardness, flow stress, yield stress and ultimate tensile stress.

6. The method of claim 1, wherein the first workpiece is a blade of a bladed disk, and the second workpiece is a hub of the bladed disk.

7. The method of claim 1, wherein the first workpiece is a vane of a gas turbine engine, or a propeller, and the second workpiece is a hub of the gas turbine engine, or the propeller.

8. A computer program that causes a computer to perform the method as claimed in claim 1.

9. A non-transitory computer readable storage medium storing a program for causing a computer to execute the method as claimed in claim 1.

10. A signal comprising computer readable instructions that cause a computer to perform the method as claimed in claim 1.

* * * * *